United States Patent [19]  
Betts et al.

[11] 3,867,354  
[45] Feb. 18, 1975

[54] CHROMIUM SALICYLATE CATALYZED EPOXIDE-CARBOXYLIC ACID ESTERIFICATION

[75] Inventors: Albert Thomas Betts, Waltham Abbey, Essex; Norbert Uri, London, both of England

[73] Assignee: Minister of Technology in Her Britannic Majesty's Government of the United Kingdom of Great Britain and Northern Ireland, London, England

[22] Filed: Aug. 15, 1969

[21] Appl. No.: 851,775

[30] Foreign Application Priority Data  
Aug. 15, 1968   Great Britain .................... 38998/68

[52] U.S. Cl......... 260/78.4 EP, 149/19.5, 149/19.6, 149/19.9, 260/2 EA, 260/2 BP, 260/47 EA, 260/94.7 A, 260/836, 260/837 R
[51] Int. Cl............................................. C08g 30/12
[58] Field of Search.......... 260/836, 2 EP, 78.4, EP, 260/94.7 A, 2 EA, 2 BP, 837 R; 149/19, 19.9, 19.5, 19.6

[56] References Cited
UNITED STATES PATENTS

| | | | |
|---|---|---|---|
| 3,305,523 | 2/1967 | Burnside | 149/19 |
| 3,424,699 | 1/1969 | Stack et al. | 260/2 EP |
| 3,476,622 | 12/1967 | Harada et al. | 149/19 |

*Primary Examiner*—Benjamin R. Padgett
*Assistant Examiner*—E. A. Miller
*Attorney, Agent, or Firm*—Stevens, Davis, Miller & Mosher

[57] ABSTRACT

Esterification reactions between a wide variety of monomeric and polymeric epoxides and carboxylic acids are catalyzed by bis- and tris- chromium(III) complexes with salicylic and substituted salicylic acids.

21 Claims, 6 Drawing Figures

CHROMIUM SALICYLATE CATALYZED EPOXIDE-CARBOXYLIC ACID ESTERIFICATION

The invention relates to improvements in epoxide reactions and is particularly concerned with esterification reactions between epoxides (that is compounds, including polymeric compounds, having at least one epoxy group) and carboxylic acids (that is compounds, including polymeric compounds, containing at least one carboxyl group).

Reactions between epoxides and carboxylic acids have numerous and widely diverse applications of which the carboxylic acid crosslinking of epoxy resins and the epoxide curing of carboxy teminated polybutadienes in composite rocket propellants may be regarded as typical. In the majority of applications it is necessary to use a catalyst in order that reaction may proceed at an adequate rate under convenient process conditions and an aim of the present invention is to provide a catalyst which may offer very significant advantages both in reaction rate and reaction characteristics.

According to the present invention, a catalyst for the reaction between a carboxylic acid and an epoxide comprises a chromium (III) chelate of salicylic acid or a substituted salicylic acid. Preferred chelates are bis-complexes (contining two ligands per metal atom), especially basic bis-complexes, (that is also containing hydroxy groups), but tris-complexes are also found to be catalysts and may be superior in some applications. Outstanding among the useful chromium (III) chelates are 3,5-di-isopropylsalicylato chelates (abbreviated to Cr(III)DIPS or CrDIPS) particularly the bis (3,5-diisopropylsalicylato)-monohydroxy chromium (III) chelate.

Where a ligand of the complex is a substituted salicylic acid, the preferred substitutes are mono-or dialkyl groups (particularly $C_{1-6}$ alkyl groups), alicyclic groups (particularly cyclohexyl groups), aryl groups (particularly phenyl and substituted phenyl) and halogen (particularly chlorine and bromine).

The optimum proportion of catalyst in accordance with the invention depends upon the proportions and functionality of the epoxides used, the type of carboxylic acid reacted, the temperature of cure, and the curing characteristics required. The appropriate proportion of catalyst can readily be determined in any particular case by simple expperiment, but will generally lie within the range 0.001 percent and 5 percent by weight of the system being catalyzed. Higher proportions may of course by used, but there is generally no advantage. The lowest concentration which achieves the desired catalytic effect is normally the preferred concentration.

Catalysts in accordance with the invention can offer considerable advantages in polymeric systems in which the functional epoxide and/or carboxylic groups are attacked to a polymer chain, normally a hydrocarbon chain. For example, a hydrocarbon polymer in liquid form having either epoxide or carboxyl groups may be cross-linked at relatively low temperatures in the presence of a chromium chelate catalyst with a di- or polyfunctional compound having the appropriate complementary reactive groups, carboxyl or epoxide groups, respectively. Such systems employed with, for example, polybutadiene gumstocks having appropriate functional groups offer curable liquid rubbers. Similarly, epoxy resins often may be crosslinked with advantage using carboxylic acids in conjunction with the catalyst of the present invention and cross-linking with, for example, carboxy terminated polybutadiene may yield adhesives for flexible joints, or castings.

A further promising application of the chromium chelate catalysts is in the field of rocket propellants based on crosslinked carboxy terminated polybutadiene (CTPB) binders. The carboxyl groups of the prepolymer are normally cross-linked with a curing agent in the form of a mixture of methylaziridine phosphorus oxide (MAPO) and one or more epoxides having generally two or three epoxide groups together with a catalyst, usually ferric linoleate. This mixed curing agent is necessitated by the fact that MAPO cross-linkages break down on storage and would eventually yield a useless liquid composition. In the presence of epoxides and ferric linoleate, propellant compositions apparently undergo a continuous post-cure and by judicious choice of the proportions of epoxide and MAPO the rate of increase of epoxide linkages may be made approximately to balance the breakdown of MAPO cross-linking to give moderately consistent properties over the storage life of propellant. Clearly a propellant composition in which the components are changing continuously during storage is undesirable and it has been realized that an all-epoxide cross-linking of CTPB would be attractive if in combination with a reasonably rapid cure the post cure phenomenon could be controlled or eliminated. Chromium chelates as hereinbefore described, particularly the bis (3,5-di-isopropylsalicylato) - monohydroxy chromium (III) chelate, can exhibit almost ideal characteristics as a catalyst for epoxide/carboxylic acid curing reactions in gumstock compositions, giving a clear cut induction period, before onset of cure, lasting several hours which allows the mixed compositions to be readily processed; followed by rapid cure and a substantial absence of post cure. The storage stability particularly at elevated temperatures of such chromium chelate/epoxide cured compositions generally has been found much superior to otherwise identical ferric linoleate catalyzed materials, no doubt partly because the chromium chelates are also antioxidants whereas ferric linoleate catalyzes oxidative degradation.

In this application, the following reagents are conveniently referred to by their respective trade marks:

ERL 0500 — a commercial grade of triglycidyl-p-aminophenol, (Union Carbide Corp.)

ERL 0510 — a commercial purified grade of triglycidyl-p-aminophenol, (Union Carbide Corp.)

DER 332 — a pure form of diglycidyl ether of bisphenol A, (Dow Chemical Co.)

ERL 4221 — 3,4-epoxy-cyclohexylmethyl-3,4-epoxy-6-methycyclohexane carboxylate, (Union Carbide Corp.)

BRIEF DESCRIPTION OF THE DRAWINGS

FIGS. 1 and 2 show comparative cure profiles in a curing system for a prior art catalyst and the invention catalyst. FIGS. 3–6 show various cure profiles of the invention catalyst. Typical cure profiles of epoxide cures of a carboxy terminated polybutadiene using one of the most desirable epoxide cure catalysts known hitherto, ferric linoleate, compared with cure profiles using a chelate according to the invention are illustrated by the accompanying drawings in which:

EXAMPLE 1

Figure 1:
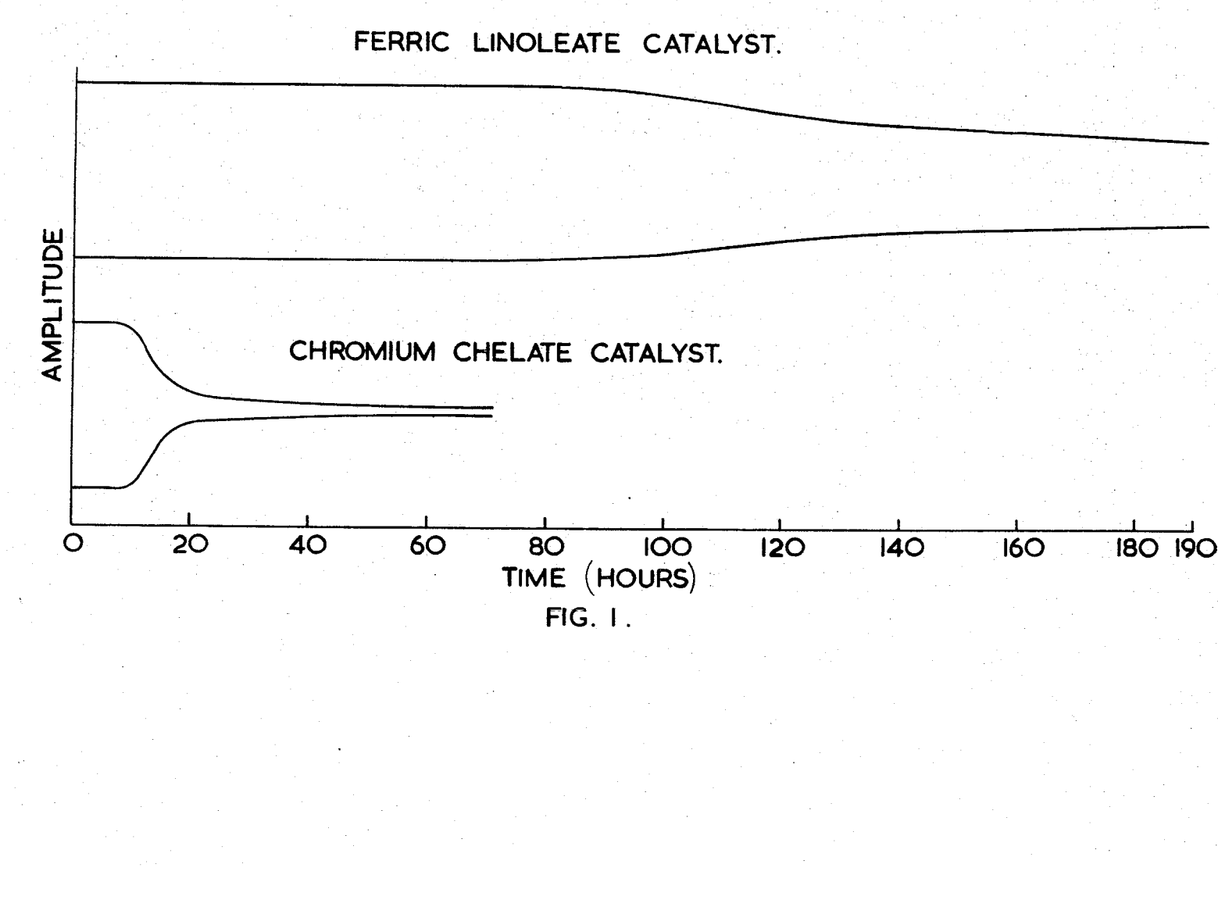
FIG. 1 shows cure profiles at 70°C of CTPB (Thiokol HC 434) containing a trifunctional epoxide (ERL 0510, 1.7 percent) and a difunctional epoxide (DER 332, 5.9 percent) in the presence of 0.15 percent by weight of respectively ferric linoleate catalyst (upper profile) and bis (3,5-di-isopropylsalicylato)monohydroxy chromium (III) (lower profile)

1.7 percent by weight of a trifunctional epoxide (ERL 0510 - Union Carbide Corp.), 5.59 percent by weight of a difunctional epoxide (DER 332 - Dow Chemical Co.) and 0.15 percent by weight of a bis(3,5-di-isopropylsalicylator)-monohydroxy chromium (III) chelate were thoroughly admixed with the polymer and gave the following cure characteristics at 70°C: induction period 10 hours; cure substantially complete after 50 hours, no significant post cure.

EXAMPLE 2

Figure 2:
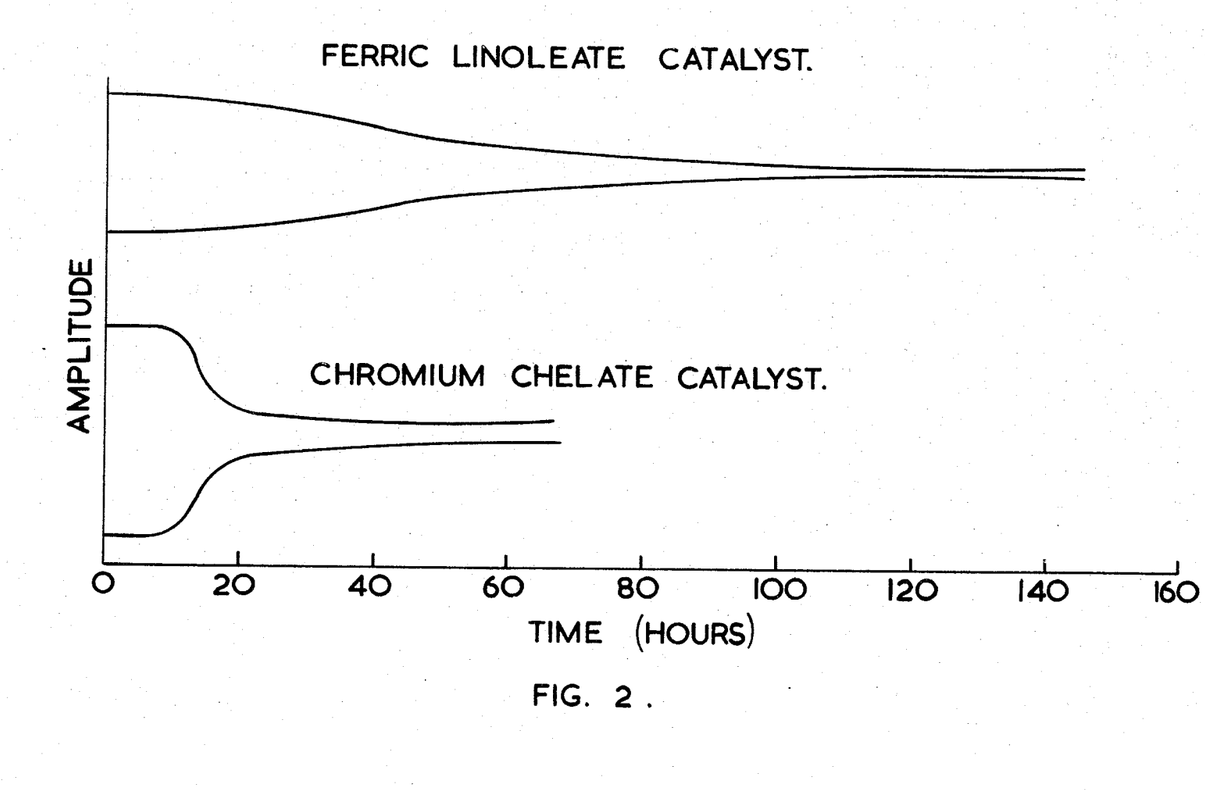
FIG. 2 shows cure profiles at 70°C or CTPB (Thiokol HC 434) containing a trifunctional epoxide (ERL 4385, 2.9 percent) and a difunctional epoxide (ERL 4221, 4.7 percent) in the presence of 0.15 percent by weight of respectively ferric linoleate catalyst (upper profile) and bis(3,5-di-isopropylsalicylato)monohydroxy chromium (III) (lower profile). The rate of cure (measured as change of amplitude in a modified Wallace-Shawbury Curometer apparatus) is a function of the rate at which the cure profile narrows with time. It is readily apparent that the catalyst in accordance with the present invention gives a highly desirable performance, having a sharply defined induction period, rapid cure and substantially no post-cure, compared with the relatively slow cure and post-cure observed with ferric linoleate catalyst. Typical quantitative examples of the cure of Thiokol HC 434 polymer (as hereinafter described with reference to the lower profiles of FIGS. 1 and 2) using a catalyst according to the invention are as follows.

2.9 percent by weight of a trifunctional epoxide (ERL 4385 - Union Carbide Corp.), 4.7 percent of a difunctional epoxide (ERL 4221 - Union Carbide Corp.), and 0.15 percent by weight of bis(3,5-di-isopropylsalicylato) - monohydroxy chromium (III) chelate were thoroughly admixed with the polymer and give the following cure characteristics at 70°C: induction period 12 hours, cure substantially complete after 38 hours, no significant post cure.

EXAMPLE 3

A composition analagous to that referred to in Example 1 was tested in the Wallace-Shawbury Curometer at 50°C and 40°C. It was found that the cure was substantially complete after 150 hours and 250 hours respectively. On the basis of the temperature coefficient thus evaluated and on the basis of the finding that the rate of cure was proportional to catalyst concentration, extrapolation to room temperature would lead to the conclusion that the fastest cure that could be obtained at room temperature (20°C) would be of the order of 65 hours provided that the catalyst concentration is increased to 3 percent which, for many purposes would be the maximum that could be tolerated. The curing of liquid rubbers at room temperature would, therefore, appear to be a practical proposition for some applications.

EXAMPLE 4

An experimental propellant batch containing 79 percent ammonium perchlorate, 5 percent aluminium, 2 percent iso-decyl pelargonate, which is used as plasticizer, and 14 percent CTPB prepolymer (Thiokol HC 434) in which epoxides DER 332 and ERL 0510 were incorporated in such proportions that the former corresponded to two thirds and the latter to one third of the COOH equivalent, showed at 60°C acceptable rates of cure when CrDIPS (made by route 1b) was present in proportions ranging from 0.05 to 0.1 percent by weight in relation to the propellant mix. Since this is a very low catalyst concentration it should be possible to achieve acceptable rates of cure at lower temperatures by an increase in catalyst concentration.

Figure 3:
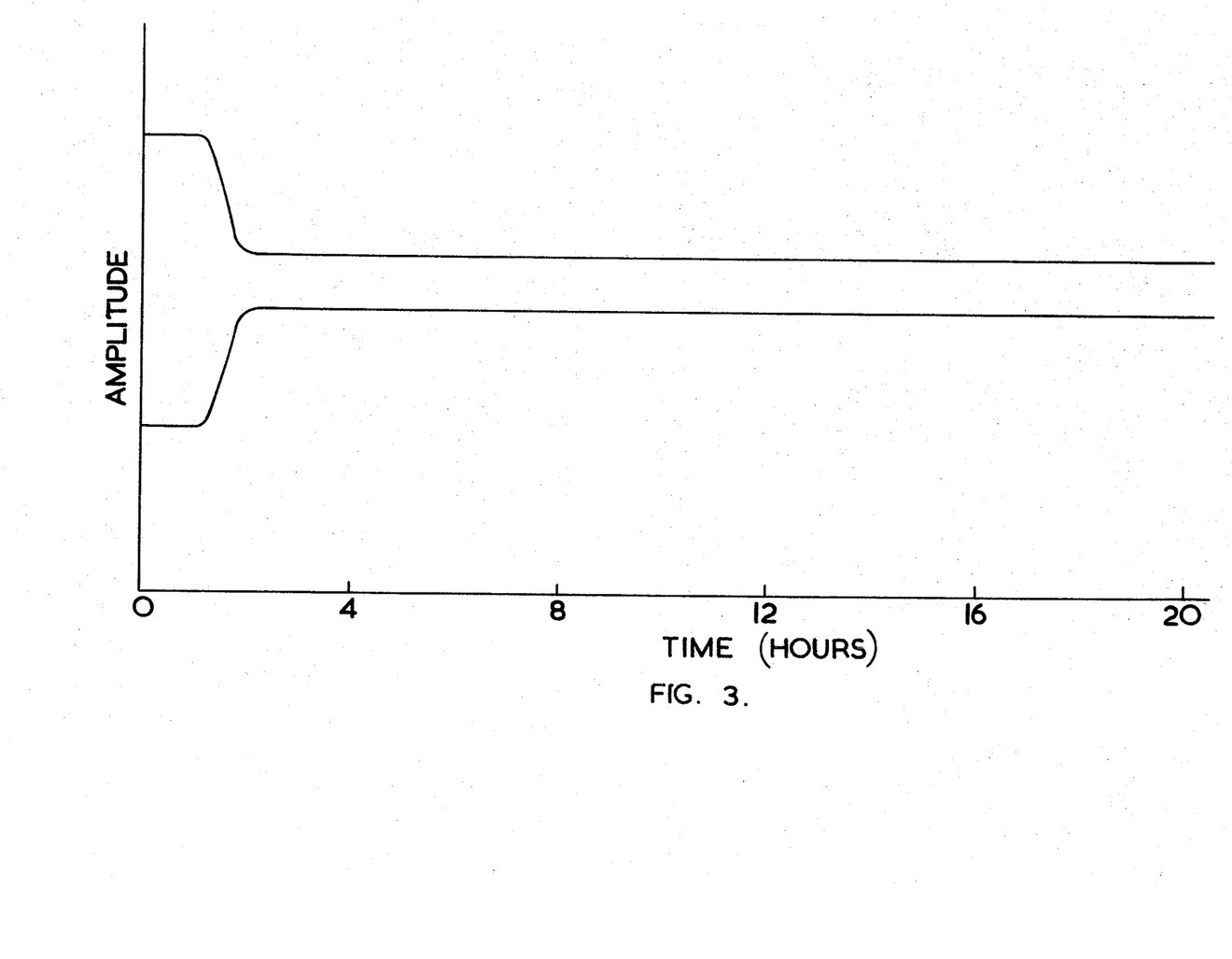

Further to examples 5–11 of the catalysis with chromium chelates in accordance with the present invention of reaction between various epoxides and carboxylic acids will now be described. Examples 5, 7, 9 and 11 are illustrated by FIGS. 3, 4, 5 and 6 of the accompanying drawings in which:

FIG. 3 shows cure profiles at 70°C of purified epoxy resin ERL 0500 containing 55 percent difunctional CTPB (Thiokol HC 434), 8.2 percent citric acid, 7.6 percent succinic acid and 3.5 percent CrDIPS (from route 4).

Figure 4:
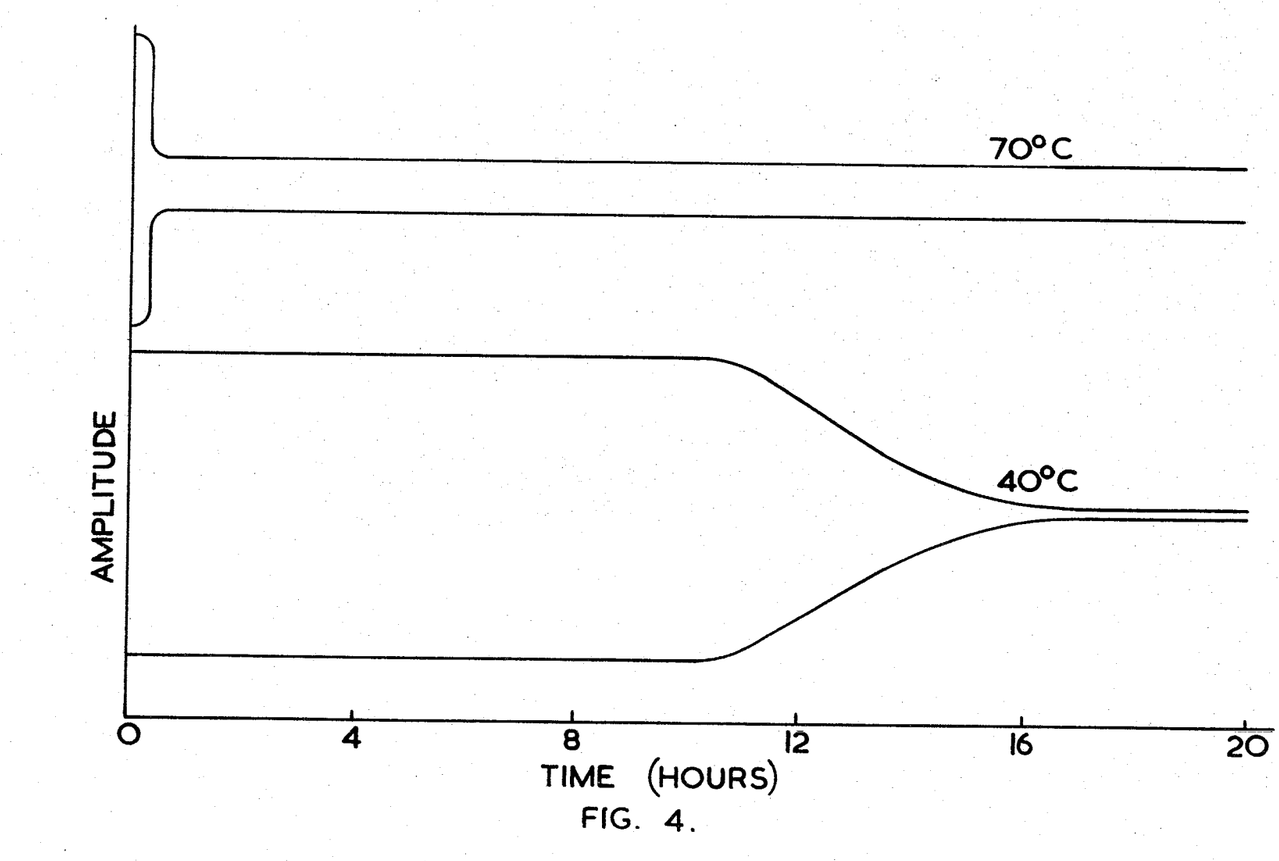

FIG. 4 shows cure profiles at 70°C and 40°C respectively for ERL 0500 (purified by vacuum distillation by means of a molecular still) containing 55.4 percent CTPB (Thiokol HC 434), 0.2 percent citric acid, 6.1% oxalic acid and 3.5 percent CrDIPS (route 4).

Figure 5:
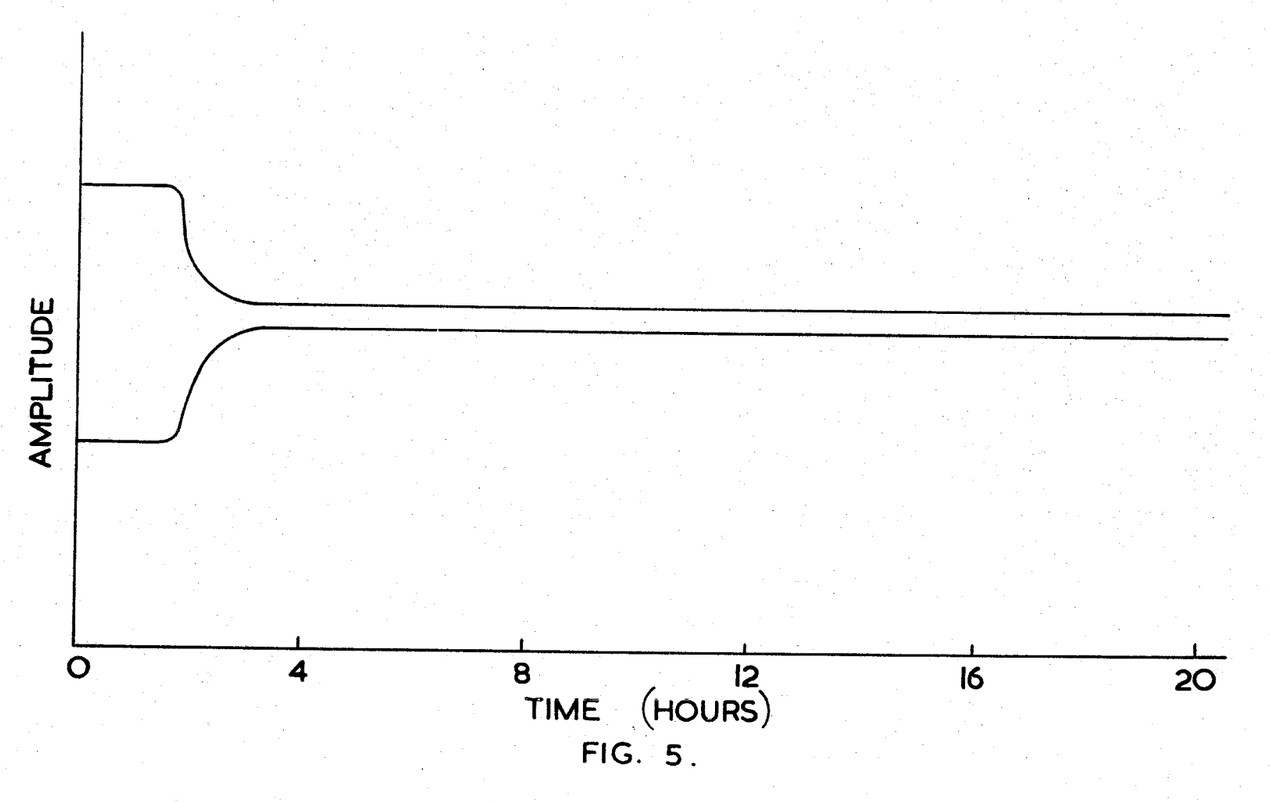

FIG. 5 shows the cure profile at 70°C of ERL 0500 (purified as mentioned above) containing 76.2 percent CTPB (Thiokol HC 434), 7.6 percent citric acid, and 2.0 percent CrDIPS (route 4).

Figure 6:
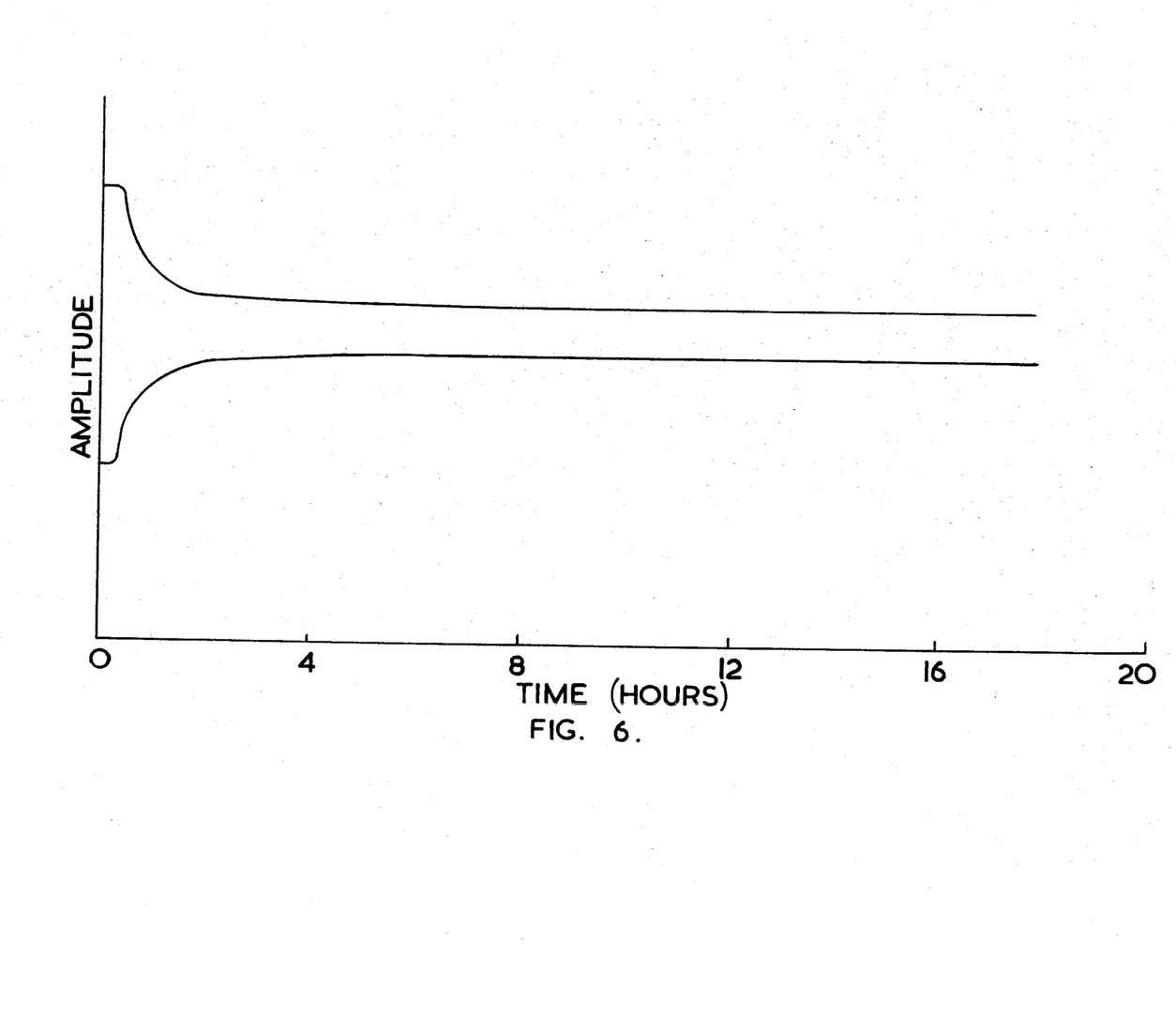

FIG. 6 shows the cure at 70°C of epoxy resin ERL 0510 containing 23.0 percent trifunctional CTPB (Thiokol ZL 636), 27.4 percent citric acid and 1.5 percent CrDPIS (route 4).

EXAMPLE 5

The purified epoxy resin ERL 0500 containing citric acid and succinic acid, and CTPB (Thiokol HC 434) containing CrDIPS (route 4) were mixed at zero time in such proportions that the final weight percentages were 25.7 percent ERL 0500, 55 percent CTPB, 8.2 percent citric acid, 7.9 percent succinic acid and 3.5 percent CrDIPS. When this preparation was carried out at 70°C, it was found that the material has substantially cured within 2 hours following an induction period of approximately 45 minutes. The resulting product was a good adhesive. The solubility barrier for this type of composition was found to be 50°C. Curing occurs below 50°C at a reduced rate because of partial precipitation of carboxylic acid.

EXAMPLE 6

The purified epoxy resin ERL 0500 containing succinic acid and CTPB (Thiokol HC 434) were mixed in such a manner that the final proportions (route 4) by weight were 27.6 percent ERL 0500, 55.3% CTPB, 15.2 percent succinic acid and 1.8 percent CrDIPS (route 4). At 70°C the cure time was 18 hours and the product was a good adhesive but, with one carboxylic acid only, it appears that there was some precipitation. When homogeneity is essential it is found necessary to use either mixtures of di- or tri-carboxylic acid and/or dicarboxylic acids of higher molecular weight such as azelaic acid, sebacic acid, etc. While dicarboxylic acids of higher molecular weight were desirable from the point of view of solubility, it was found that the first member in the series, i.e. oxalic acid, could also be used successfully in conjunction with other dicarboxylic acids.

EXAMPLE 7

The composition was the same as that of Example 6 except that two dicarboxylic acids were used, i.e. 7.5 percent succinic acid and 9.2 percent adipic acid (final concentrations). The cure at 70°C lasted 16 hours and a good adhesive was obtained.

EXAMPLE 8

The purified epoxy resin ERL 0500 containing CrDIPS (route 4), and CTPB (Thiokol HC 434) containing oxalic acid and citric acid were mixed so that the final proportions were 25.8 percent ERL 0500, 55.4 percent CTPB, 6.1 percent oxalic acid, 9.2 percent citric acid and 3.5 percent CrDIPS. At 70°C the cure was substantially complete in less than 1 hour. The resultant epoxy resin was quite hard and proved a good adhesive. At 40°C the cure was very much slower than would normally be expected if the drop of temperature were the only significant factor. There is some likelihood that under these conditions the mixture became heterogenous as a result of a very slight precipitation of dicarboxylic acid. It was, therefore, shown that oxalic acid contributes to the rate of cure but, where conditions are such that solubility considerations matter, it would have to be used in conjunction with another dicarboxylic acid of higher molecular weight.

EXAMPLE 9

The purified epoxy resin ERL 0500 containing citric acid and CTPB (Thiokol HC 434) and CrDIPS (route 4) were mixed so that the final proportions were 14.2 percent ERL 0500, 76 percent CTPB, 7.6 percent citric acid and 2 percent CrDIPS. At 70°C this material cured very rapidly after an induction period lasting over 1½ hours and the cure was substantially complete in about 2½ hours.

EXAMPLE 10

The epoxy resin Epikote 828 was blended with trifunctional CTPB (Thiokol ZL 636), citric acid and CrDIPS, so that the final proportions were 55.1 percent. Epikote 828, 23.2 percent trifunctional CTPB, 20 percent citric acid and 1.7 percent CrDIPS (route 4). The cure of this difunctional epoxide with a mixture of trifunctional carboxylic acid and trifunctional CTPB was complete within 10 hours at a temperature of 70°C. Similar experiments were carried out with DER 332 and also mixtures of DER 332 and Epikote 828, with a view to adjusting the viscosity of the mix.

EXAMPLE 11

The epoxy resin ERL 0510 containing citric acid and the trifunctional CTPB (Thiokol ZL 636) containing 1.5 percent CrDIPS (route 4) (the additives were incorporated by means of ethanol at room temperature and the ethanol evaporated under vacuum without raising the temperature) were mixed so that the final proportions were 35.0 percent ERL 0510, 23.0 percent trifunctional CTPB, 27.4 percent citric acid and 1.5 percent CrDIPS. At 70°C the cure was complete after 1½ hours and marked by a very short induction period lasting a few minutes only which, for some purposes may be a disadvantage while it could be a desirable feature for special requirements. The resulting product was a moderately good adhesive.

To some extent the activity of catalysts in accordance with the invention is found to depend on their method of preparation and typical preparative procedures (1, 2, 3 & 4) giving acceptable materials, are as follows:

1. 6.2 g of chromic acetate (monohydrate), which was first prepared by double decomposition of chromic sulphate with barium acetate, and 16.1 g of 3,5-di-isopropylsalicylic acid were refluxed for at least 3 hrs in 90 percent aqueouc methanol and then both acetic acid formed in the course of the reaction and methanol were removed by evaporation in vacuo. Thereafter the following two methods were used:
   a. the material was redissolved in 90 percent methanol and again evaporated to dryness to remove more acetic acid and this procedure was repeated five times to ensure quantitative removal of acetic acid.
   b. The material was washed with hot water to remove unreacted chromic acetate aand thereafter suspended in an aqueous molar sodium bicarbonate solution and stirred for 1 hr and then filtered for the removal of unreacted DIPS. The precipitate was then washed with water to remove excess sodium bicarbonate. Recrystallization of this material is very difficult because of its tendency to formation of oils but a successful method was developed by dissolving the material in acetone, filtering and adding very slowly under vigorous stirring to a tenfold excess of an aqueous solution of 16 percent $MgCl_2.6H_2O$. Under these conditions microcrystalline precipitates were formed which were filtered off and washed with water to remove any absorbed magnesium chloride and then dried for 16 hrs at 50°C at about 1 mm pressure.

2. (a) and (b) are identical with 1(a) and (b) except that 9.3 g chromic acetate monohydrate instead of 6.2 g were used (i.e. a 2 : 1 instead of 3 : 1 ligand : metal molar ratio).

3. Preparation from aqueous solutions. These were usually carried out with excess chromic sulphate. The di-isopropylsalicylic acid was dissolved either in dilute ammonia or in aqueous molar sodium bicarbonate solution and then acidified with sulphuric acid to a pH of approximately 5.8 just avoiding precipitation of DIPS. This solution was then slowly added under stirring into an excess of aqueous chromic sulphate. The precipitate formed was filtered and thereafter treated in a similar way as in 1(b).

The products of preparative routes 1(a) and 2(a) contain active chelates in accordance with the invention, but are too impure for their analysis to give meaningful results concerning formula and structure. Analysis of the products from the remaining routes gave the following results.

1.(b) $C = 59.2$ percent, $H = 6.86$ percent. $Cr = 10.05$ percent 2.(b) $C = 52.5$ percent, $H = 6.48$ percent, $Cr = 13.0$ percent 3. $C = 61.8$ percent, $H = 7.17$ percent, $Cr = 7.2$ percent Preparation 1.(b) is therefore assumed to be predominantly $Cr(DIPS)_2OH.H_2O$ (calculated, $C = 59.0$, $H = 7.04$, $Cr = 9.82$ percent).

Preparation 2.(b) is assumed to be a mixture of $Cr(DIPS)(OH)_2.H_2O$ (calculated, $C = 48.0$, $H = 6.51$, $Cr = 16.0$ percent) and $Cr(DIPS)OH.H_2O$.

Preparation 3. is assumed to be a mixture of $Cr(DIPS)_3$ (probably hydrates) and $Cr(DIPS)_2.OH.H_2O$, with the former predominating (calculated for $Cr(DIPS)_3.2H_2O$, $C = 62.3$ percent, $H = 7.37$ percent, $Cr = 6.92$ percent).

4. The preparation may be simplified for the purpose of obtaining an active material on a large scale. The washing with aqueous sodium bicarbonate and water (a number of short quick washes was found to be advisable) was carried out after dissolving the crude CrDIPS (following removal of the last traces of acetic acid) in methylene chloride, thus obviating the need to handle solids in bulk quantities. It was also found to be possible to use for this purpose iso-decyl pelargonate. The latter may be advantageously used when the catalyzed system involves the use of iso-decyl pelargonate as a plasticizer, since it can also be used as the carrier of the catalyst for the purpose of incorporating it into the polymer. When solid catalyst material is required, methylene chloride in vacuo is used after washing with sodium bicarbonate and water has been completed.

The incorporation of catalyst into an epoxide/carboxyl acid system, particularly into an epoxide/carboxyterminated hydrocarbon polymer system, may be achieved by any suitable process, but in accordance with a feature of the invention, a catalyst is incorporated to achieve a homogeneous dispersion as follows:

The chromium chelate dissolved in methylene chloride or other solvent is stirred into carboxyterminated hydrocarbon prepolymer and heated for two hours on a water bath under a vacuum of about 1 mm. Solvent and water are removed by this process to give a polymer containing homogeneously distributed catalyst. The epoxide component is then directly incorporated with stirring into the prepolymer containing the catalyst. Alternatively, the catalyst may be incorporated by means of a plasticizer, such as iso-decyl pelargonate, if it is convenient to have a plasticizer present in the resulting product.

When the main object is to cure an epoxy resin by means of carboxylic acids in the presence of CTPB, then the preferred method is the incorporation of carboxylic acids or their mixtures into CTPB, and the incorporation of CrDIPS catalyst into the epoxide. In that way two non-reactive components of the mixture are available at zero time and produce, after mixing, a very useful induction period before any reaction occurs. Ethanol was found to be a very suitable solvent for the incorporation of carboxylic acids as well as CrDIPS into the different major components; the solvent is then evaporated at room temperature in vacuo. The preferred di- or tricarboxylic acids are those that contain at least 10 carbon atoms (e.g. sebacic acid) or containing one or more hydroxy groups (e.g. citric and tartaric acid) although for certain purposes oxalic acid was found to be very efficient when present together with other di- or tricarboxylic acids. The simultaneous incorporation of a number of di- or tricarboxylic acids eases solubility problems. Although this is usually less desirable, it was found (cf. Example 11) that with care it was possible to incorporate the catalyst into the CTPB and carboxylic acids into the epoxide. It should be noted, however, that these are more reactive mixtures which may well be unsuitable for long-term storage. When no CTPE is used and the CrDIPS-catalized cure of the epoxy resin by means of carboxylic acids is carried out per se, incorporation must be effected at a low temperature and the materials used immediately. With certain epoxy resins, incorporation of additives can be carried out without the use of a solvent, the viscosity of the epoxide and the solubility of the additive permitting.

The effectiveness of catalysts in accordance with the invention may be readily illustrated by results obtained in the reaction between hexoic acid and epoxides. The rate of consumption of hexoic acid (measured in terms of the half-life of free hexoic acid) convincingly demonstrates the potential of the present catalysts in comparison with the series of conventional alternatives: ferric linoleate (most generally used at present), the acetylacetonate chelates of iron (III), chromium (III) and cobalt (III), chromic hexoate, chromic octoate, chromic stearate, chromic naphthenate probably a mixture of chromic octoates with chromic ethyl hexoate predominating), the N-butylsalicylaldimio chelates of cobalt (II), copper (II), nickel (II), zinc (II) and cobalt (III), N-phenylsalicylaldimino cobalt (II), and the 3,5-di-isopropylsalicylato chelates of nickel (II), manganese (II), cobalt (II), copper (II), oxyvanadium (IV) and chromium (III). the following tables I and II give examples of the half-lives of M/2 hexoic acid (the initial concentration is important because of a zero order reaction) which are obtained for systems containing a difunctional epoxide (M/4 DER 332 - product of Dow Chemical Co.) in Table I and a trifunctional epoxide (M/6 ERL 0510 - product of Union Carbide Corp.) in Table II. The reactions were all carried out in toluene at 70°C.

TABLE I (difunctional epoxide)

| Additive (M/200) | Half life of free Hexoic Acid |
|---|---|
| BuSalCo(III) | greater than 160 hours |
| BuSalNi(II) | do. |
| Ni(II)DIPS | do. |
| Fe(III) linoleate | do. |
| Co(III)AcAc | do. |
| Fe(III)AcAc | do. |
| BuSalCo(II) | do. |
| BuSalCu(II) | do. |
| BuSalZn(II) | do. |
| PhSalCo(II) | do. |
| Mn(II)DIPS | do. |

TABLE I (difuncational epoxide)—Continued

| | Additive (M/200) | Half life of free Hexoic Acid |
|---|---|---|
| | Co(II)DIPS | do. |
| | Cu(II)DIPS | do. |
| | V(IV)ODIPS | do. |
| | Cr(III) hexoate | do. |
| | Cr(III) octoate | do. |
| | Cr(III)AcAc | 140 hours |
| | Cr(III) stearate | 22 hours |
| | Cr(III) naphthenate | 6 hours |
| | (5-t-butylsalicylato Cr(III) | 2½ hours |
| | (Cr(III)½DIPS prepared by route 1a | 3½ hours |
| | (Cr(III)DIPS by route 1.b | 1½ hours |
| | (Cr(III)DIPS by route 2.a | 3½ hours |
| | (Cr(III)DIPS by route 2.b | 1½ hours |
| present | (Cr(III)DIPS by route 3 | 7 hours |
| invention | (Cr(III)DIPS by route 4 | 1¾ hours |
| | (tris(salicylato)Cr(III) | 1¾ hours |
| | (3-t-butylsalicylate Cr(III) | 2¼ hours |
| | (5-phenylsalicylato Cr(III) | 2 hours |
| | (5-chlorosalicylato Cr(III) | 1½ hours |

Table II (trifunctional epoxide)

| | Additive (M/200) | Half life of free Hexoic Acid |
|---|---|---|
| | NONE | 150 hours |
| | Co(II)DIPS | 120 hours |
| | V(IV)ODIPS | 120 hours |
| | BuSalCu(II) | 115 hours |
| | BuSalCo(II) | 110 hours |
| | Ni(II)DIPS | 110 hours |
| | Mu(II)DIPS | 110 hours |
| | Co(III)AcAc | 110 hours |
| | BuSalZn(II) | 110 hours |
| | PhSalCo(II) | 105 hours |
| | BuSalNi(II) | 105 hours |
| | BuSalCo(III) | 95 hours |
| | Fe(III)AcAc | 60 hours |
| | Cr(III)AcAc | 55 hours |
| | Fe(III)linoleate | 35 hours |
| | Cr(III) naphthenate | 10 hours |
| present invention | Cr(III)DIPS by route 3 | 4 hours |

The abbreviations used in Tables I and II have the following meanings: BuSal = N-butylsalicylaldimino-; AcAc = acetyl acetonate; PhSal = N-phenylsalicylaldimino; DIPS = di-isopropylsalicylato

We claim:

1. In an esterification reaction between an epoxide and a carboxylic acid to form an hydroxyester, the step of providing an esterification catalyst selected from the group consisting of bis- and tris - chromium (III) chelates of:
   salicylic acid;
   mono- and dialkyl-substituted salicylic acids;
   alicyclic-substituted salicylic acids; and aryl and substituted-aryl substituted salicylic acids.

2. In an esterification reaction between an epoxide and carboxylic acid to form an hydroxyester, the step of providing an esterification catalyst selected from the group consisting of bis- and tris- chromium (III) chelates of:
   salicylic acid; chloro-and bromo- substituted salicylic acids;
   $C_{1-6}$ alkyl substituted salicylic acids; cyclohexyl-substituted salicyclic acids;
   phenyl and methylphenyl-substituted salicylic acids.

3. In an esterification reaction between an epoxide and a carboxylic acid to form an hydroxyester, the step of providing an esterification catalyst selected from the group consisting of bis- and tris- (3,5-di-isopropylsalicylato) chromium (III) chelates.

4. In an esterification reaction between an epoxide and a carboxylic acid to form an hydroxyester the step of providing an esterification catalyst which is bis-(3,5-di-isopropylsalicylato) - monohydroxy chromium (III) chelate.

5. A process for catalysing an esterification reaction between an epoxide and a carboxylic acid to form an hydroxy-ester according to claim 1 which comprises introducing into the reaction mixture between about 0.001 and 5 percent of the esterification catalyst.

6. A process according to claim 5 wherein the epoxide is selected from the group consisting of:-
   polymers having at least one epoxy group; monomers having two epoxy groups; and monomers having three epoxy groups.

7. A process according to claim 6 wherein said polymers having at least one epoxy group are hydrocarbon polymers.

8. A process according to claim 5 wherein the carboxylic acid is selected from the group consisting of:
   polymers having at least one carboxyl group;
   dicarboxylic acids;
   tricarboxylic acids;
   hydroxy-carboxylic acids;
   and mixtures thereof.

9. A process according to claim 8 wherein said polymers having at least one carboxyl group are selected from the group consisting of di- and tri- functional carboxy terminated hydrocarbon polymers.

10. A process according to claim 9 wherein said carboxy terminated hydrocarbon polymers are polybutadiene polymers.

11. A process according to claim 5 wherein the carboxylic acid is selected from the group consisting of dicarboxylic acids having at least ten carbon atoms.

12. A process according to claim 5 wherein the carboxylic acid is selected from the group consisting of oxalic acid, adipic acid, succinic acid, tartaric acid and citric acid.

13. A rocket propellant binder, comprising: a carboxy terminated polybutadiene selected from the group consisting of mono-di- and tri- functional carboxy terminated polybutadienes and mixtures thereof; admixed with an epoxide selected from the group consisting of di- and tri- functional epoxides and mixtures thereof; and an esterification catalyst comprising a chromium (III) chelate of salicylic acid or a substituted salicylic acid.

14. In an esterification reaction between an epoxide and a carboxylic acid to form an hydroxy-ester, the step of providing a catalyst which is a chromium (III) chelate which is prepared by:
mixing a chromic acetate monohydrate with di-isopropylsalicylic acid and refluxing the mixture in aqueous methanol;
removing acetic acid and methanol from the solution;
dissolving the remainder from the solution in aqueous methanol and evaporating the methanol, thereby also removing further acetic acid; and
redissolving the remainder in aqueous methanol, again evaporating the methanol, thereby removing further acetic acid.

15. In an esterification reaction between an epoxide and a carboxylic acid to form an hydroxy-ester, the step of providing a catalyst which is a chromium (III) chelate which is prepared by:
mixing a chromic acetate monohydrate with di-isopropylsalicylic acid and refluxing the mixture in aqueous methanol;
removing acetic acid and methanol from the solution;
washing the remainder from the solution with hot water to remove unreacted chromic acetate;
suspending the remainder in an aqueous sodium bicarbonate solution, filtering, and washing the precipitate;
desolving the precipitate in acetone and filtering;
adding the acetone solution slowly with mixing to an excess aqueous solution of magnesium chloride;
filtering off any precipitate, and washing and drying the precipitate.

16. In an esterification reaction between an epoxide and a carboxylic acid to form an hydroxy-ester, the step of providing a catalyst which is a chromium (III) chelate which is prepared by:
dissolving di-isopropylsalicylic acid in a solvent selected from the group consisting of dilute ammonia and aqueous sodium bicarbonate solution;
acidifying the solution with sulfuric acid while avoiding precipitation of the di-isopropylsalicylic acid;
slowly adding the acidified solution to an excess of aqueous chromic sulfate;
filtering off the precipitate from the mixed solutions;
washing the precipitate with hot water thereby removing any unreacted chromium sulfate;
suspending the precipitate in an aqueous sodium bicarbonate solution, filtering, and washing the precipitate;
dissolving the precipitate in acetone, and filtering;
adding the acetone solution slowly with mixing to an excess aqueous solution of magnesium chloride;
filtering off the precipitate, and washing and drying the precipitate.

17. In an esterification reaction between an epoxide and a carboxylic acid to form an hydroxy-ester, the step of providing a catalyst which is a chromium (III) chelate which is prepared by:
mixing a chromic acetate monohydrate with di-isopropylsalicylic acid and refluxing the mixture in aqueous methanol;
removing acetic acid and methanol from the solution;
dissolving the remainder from the solution in methylene chloride;
washing the methylene chloride solution with aqueous sodium bicarbonate and water.

18. The esterification method of claim 14, wherein the chromic acetate monohydrate is prepared by double decomposition of chromic sulfate with barium acetate.

19. The esterification method of claim 15, wherein the chromic acetate monohydrate is prepared by double decomposition of chromic sulfate with barium acetate.

20. The esterification method of claim 16, wherein the chromic acetate monohydrate is prepared by double decomposition of chromic sulfate with barium acetate.

21. The esterification method of claim 17, additionally comprising a subsequent step of evaporating the washed methylene chloride solution to recover solid chromium (III) chelate.

* * * * *